United States Patent [19]

Machida et al.

[11] Patent Number: 4,997,731
[45] Date of Patent: Mar. 5, 1991

[54] PACKED BATTERY AND METHOD OF MAKING THE SAME

[75] Inventors: Toyoji Machida; Akiyoshi Sakai; Katsushiro Gotou, all of Sumoto, Japan

[73] Assignee: Sanyo Electric Co., Ltd., Moriguchi, Japan

[21] Appl. No.: 313,674

[22] Filed: Feb. 22, 1989

[30] Foreign Application Priority Data

Feb. 24, 1988 [JP] Japan .............................. 63-23161[U]

[51] Int. Cl.⁵ .............................................. H01M 2/20
[52] U.S. Cl. ...................................... 429/90; 429/159; 429/164; 429/170
[58] Field of Search .................. 429/96, 99, 100, 159, 429/158, 123, 163, 164, 170, 121, 178, 177; 307/150; 320/15–18

[56] References Cited

U.S. PATENT DOCUMENTS

| | | | |
|---|---|---|---|
| 2,225,460 | 12/1940 | Porth | 429/123 |
| 3,056,850 | 10/1962 | Rauske et al. | 29/159 X |
| 3,650,841 | 3/1972 | Brindley | 429/159 |
| 4,057,677 | 11/1977 | Mabuchi | 429/100 |
| 4,091,187 | 5/1978 | Kaye | 429/159 |
| 4,123,598 | 10/1978 | Hammel | 429/159 |
| 4,724,189 | 2/1988 | Chase | 429/99 |

FOREIGN PATENT DOCUMENTS

2316758 1/1977 France .
2088158 6/1982 United Kingdom .

OTHER PUBLICATIONS

Research Disclosure, No. 177, p. 5, abstract No. 17742: "Battery Assemblies".
Patent Abstracts of Japan, vol. 10, No. 306, Oct. 17, 1986, "Battery Power Source Mounting Device for Electronic Equipment".

*Primary Examiner*—Anthony Skapars
*Attorney, Agent, or Firm*—Armstrong, Nikaido, Marmelstein, Kubovcik & Murray

[57] ABSTRACT

The present invention relates to a packed battery unifying a plurality of battery cells housed in a case. The case comprises a tubular body housing the battery cells and a couple of lids closing both the end openings of the tubular body respectively, thus being arranged in a three-unit construction. This arrangement allows the case to be completely sealed off by ultrasonic wave welding.

8 Claims, 11 Drawing Sheets

PACKED BATTERY AND METHOD OF MAKING THE SAME

BACKGROUND OF THE INVENTION

1. Field of the Invention

The present invention relates to a packed battery unifying a plurality of battery cells housed in a case.

2. Description of the Prior Art

A packed battery which has a plurality of battery cells housed in a case and connected with their electrodes to terminal members exposed outside the case, has been used as an electric power source for a photo camera, a video camera, or the like. Such a packed battery includes a couple of column-shaped battery cells 62, 62 housed in parallel arrangement in an elliptically cylindrical case 61 as shown in FIGS. 1, 2, 3 and 4 and is disclosed in Japanese Patent Application Laid-Open No. 14662 (1987). Their respective positive electrodes 62a, 62a are arranged in opposite directions. The battery cells 62, 62 are connected in series by a connector 63 placed at one end so as to extend between the positive and negative electrodes. The two battery cells 62, 62 are also connected at the other end to terminal members 64, 64 respectively. Each of the two terminal members 64, 64 is exposed, at one end, outside of the case 61. The case 61 comprises a pair of half-units 61a, 61a so as to be separable lengthwisely thereof.

A method of assembly of such a packed battery is as follows. The two battery cells 62, 62 are housed in the half-units 61a, 61a with the connector 63 disposed at one end and the terminal members 64, 64 disposed at the other end. The case 61 is securely gripped at both top and bottom portions between an ultrasonic wave transducer and a fixing stand and then, exposed to ultrasonic wave. Accordingly, the half-units 61a, 61a are heated up along their confronting circumferential edges and welded together. However according to such an arrangement for welding, the case 61 has poor welding effect on both side portions thereof. More particularly, intensive welding about the side portions of the case 61 results in overheat at the top and bottom portions of the same. Thus, the finish of welding becomes unsatisfactory and the accuracy in the exterior measurements cannot be secured. This occurs due to less energy transfer of ultrasonic wave vibration to the side welding portions of the case half-units 61a, 61a.

There are also other similar arrangements of a packed battery described in U.S. patent application No. 899036 (1978) and U.S. patent application No. 425055 (1973), each of which has a lengthwisely separable battery case thus offering a similar welding problem.

FIG. 5 shows a packed battery disclosed in Japanese Patent Application Laid-Open No. 39862 (1986) having a bottom closed cylindrical case 71 which contains a couple of battery cells 72, 72 arranged in opposite directions to each other and is closed at upper end with a lid 73. The lid 73 has on the inner side a connector 74 for connection in series. The case 71 has in the bottom a pair of openings 75, 75 for access to their respective positive and negative electrodes of the two battery cells 72, 72. Although the case 71 and the lid 73 are easily and securely joined to each other by welding, in this arrangement, both the positive and negative electrodes sink into the case 71 thus limiting effective use and being less practical for use.

As for the positions of electrodes or terminal members, it is desirable to have the terminal members 64, 64 extending between the end and side of the case as shown in FIGS. 1 to 4. Such an arrangement allows an electric apparatus using a packed battery to locate its power terminals more flexibly. In other words, the power terminals of the apparatus can be located on either an end side or a peripheral side of the apparatus. On the other hand, in U.S. patent application Nos. 899036 (1978) and 425055 (1973), the power terminals are provided only on an end side.

A packed battery is most commonly used in a photo camera. Such specific packed batteries are disclosed in Japanese Patent Application Laid-Open Nos. 2157, 2158 and 2159 (1987) having power terminals on both end and peripheral sides of the case although their case constructions are not clearly described.

SUMMARY OF THE INVENTION

A first object of the present invention is to provide a packed battery having a case sealed by ultrasonic wave welding entirely and satisfactorily.

A second object of the present invention is to provide a packed battery facilitated for assembly and a method of making the same.

A third object of the present invention is to provide a packed battery having electrodes and terminal members at appropriate locations so that it can be loaded into an electric apparatus of various types.

The above and further objects and features of the invention will more fully be apparent from the following detailed description with accompanying drawings.

DESCRIPTION OF THE PREFERRED EMBODIMENTS

Figure 1:
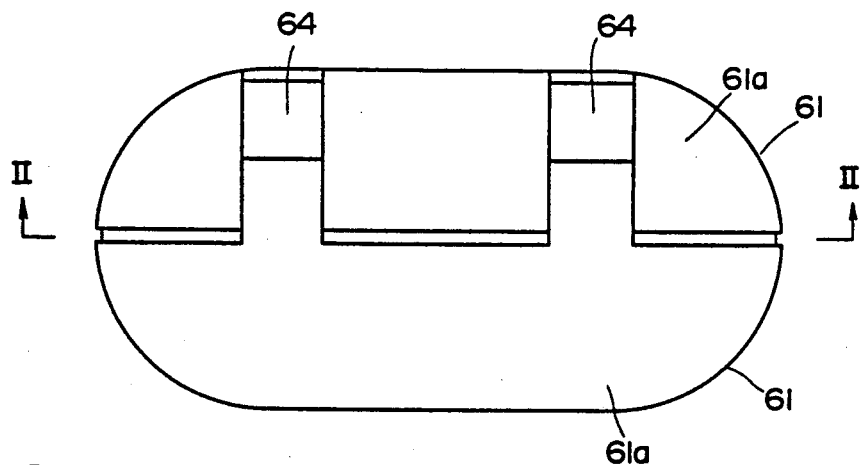
FIG. 1 is a plan view of a prior art packed battery.
Figure 2:
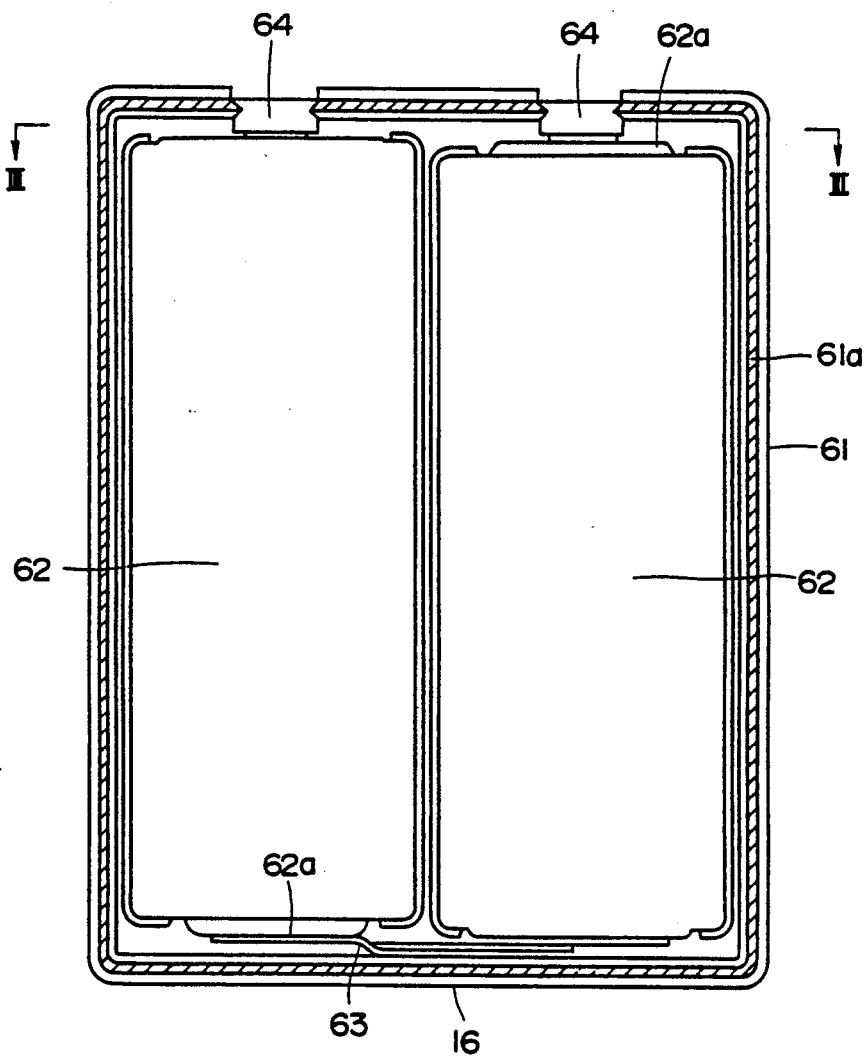
FIG. 2 is a cross sectional view taken along the line II—II of FIG. 1.
Figure 3:
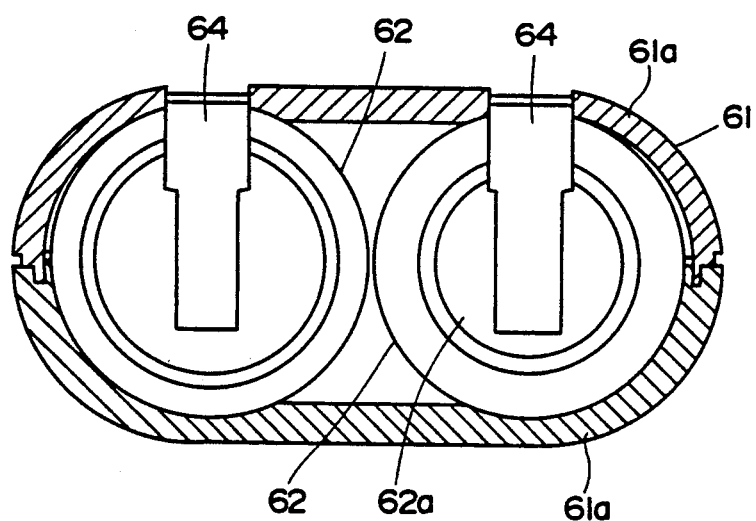
FIG. 3 is a cross sectional view taken along the line III—III of FIG. 2.
Figure 4:
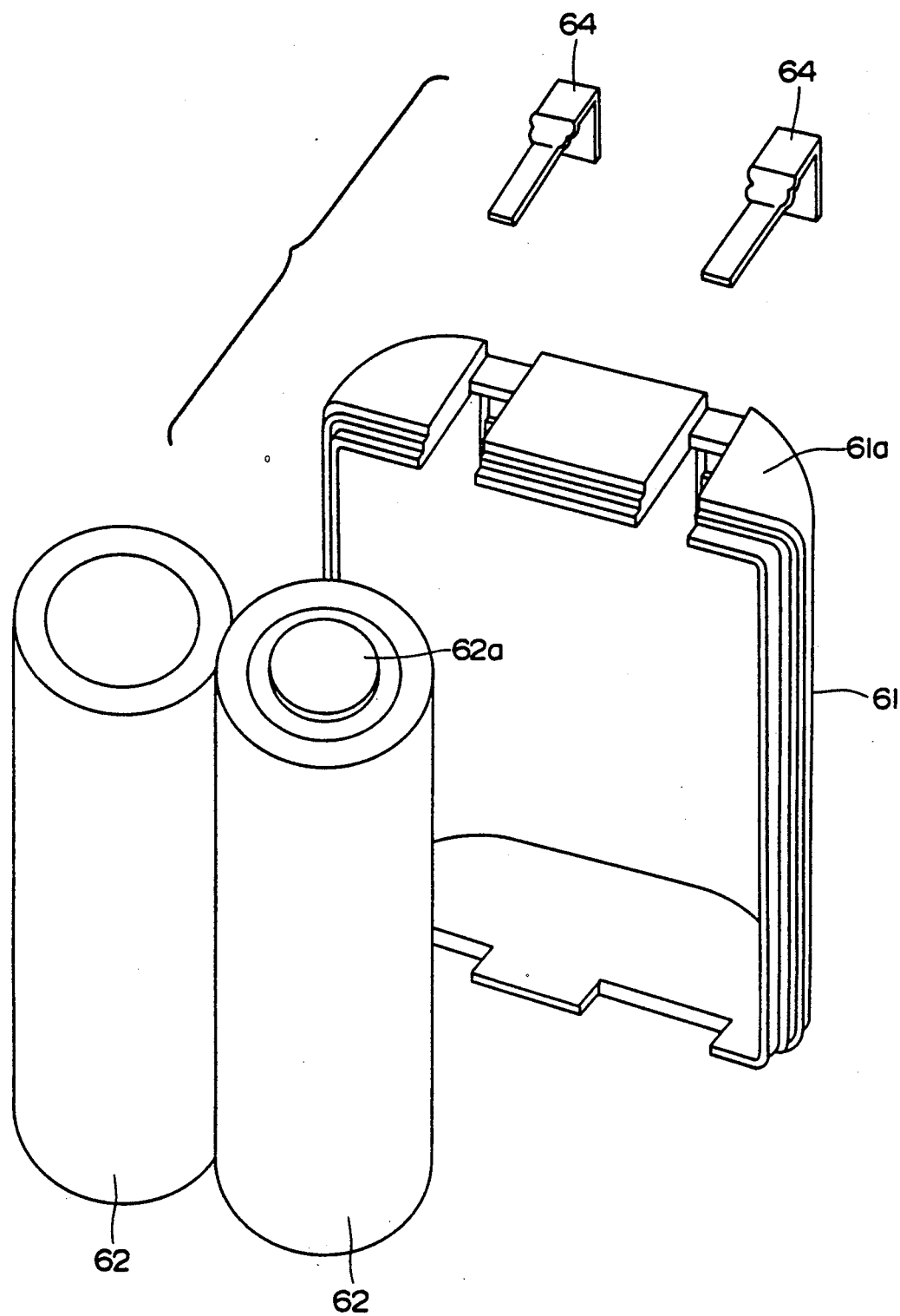
FIG. 4 is a partially disassembled perspective view of the same.
Figure 5:
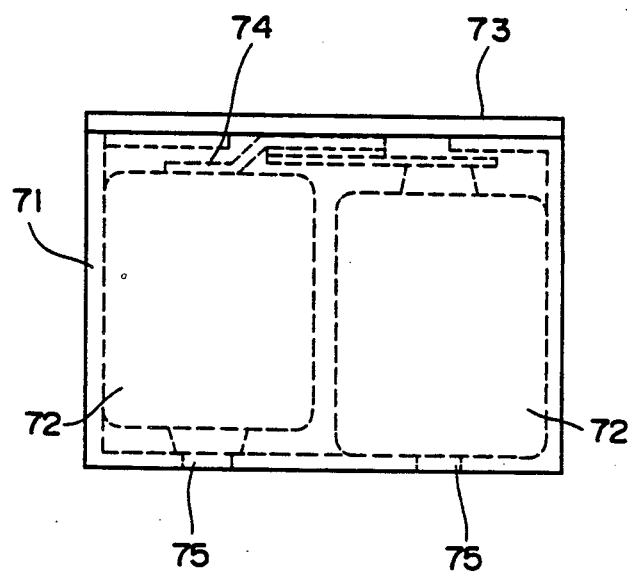
FIG. 5 is a side view of another prior art packed battery.

A packed battery according to the present invention has a case 1 of thermoplastic resin in which a couple of battery cells (A), (A) are housed in parallel arrangement to each other and comprises a tubular body 10, a first (top) lid 2, and a second (bottom) lid 3 so as to have a 3-unit construction. The battery cell (A) is of a column shape having at one end a disk like negative electrode (a) and also, a positive electrode (b) extending throughout its circumferential side and opposite end. More particularly, the positive electrode (b) is exposed of a conductive body without a coat of insulation. The two battery cells (A), (A) are housed in the case 1 with their respective negative electrodes (a), (a) facing in opposite directions. One of the battery cells (A) which places its negative electrode in the first lid 2 side, has an insulation ring 6 on the negative electrode (a) end portion thereof. The insulation ring 6 is formed in a tubular shape having an axial length considerably shorter than that of the battery A and also, provided with an inwardly extending flange at the negative electrode (a) end. The inwardly extending flange of the ring 6 has a radial direction length enough to cover a portion of the outer rim of the negative electrode (a) end, because the conductive body not only comprises the circumferential side and positive electrode (b) end of the battery cell (A) but extends to the said portion of the negative electrode (a) end. The tubular body 10 is of elliptical tubular shape having a relative length and an inner space for housing a couple of the battery cells, (A), (A). More specifically, the tubular body 10 has two sides along the direction parallely to the two battery cells (A), (A); i.e., one side is flat and another side is an arcuate shape so as to correspond to the shapes of the battery cells (A), (A).

Figure 6:
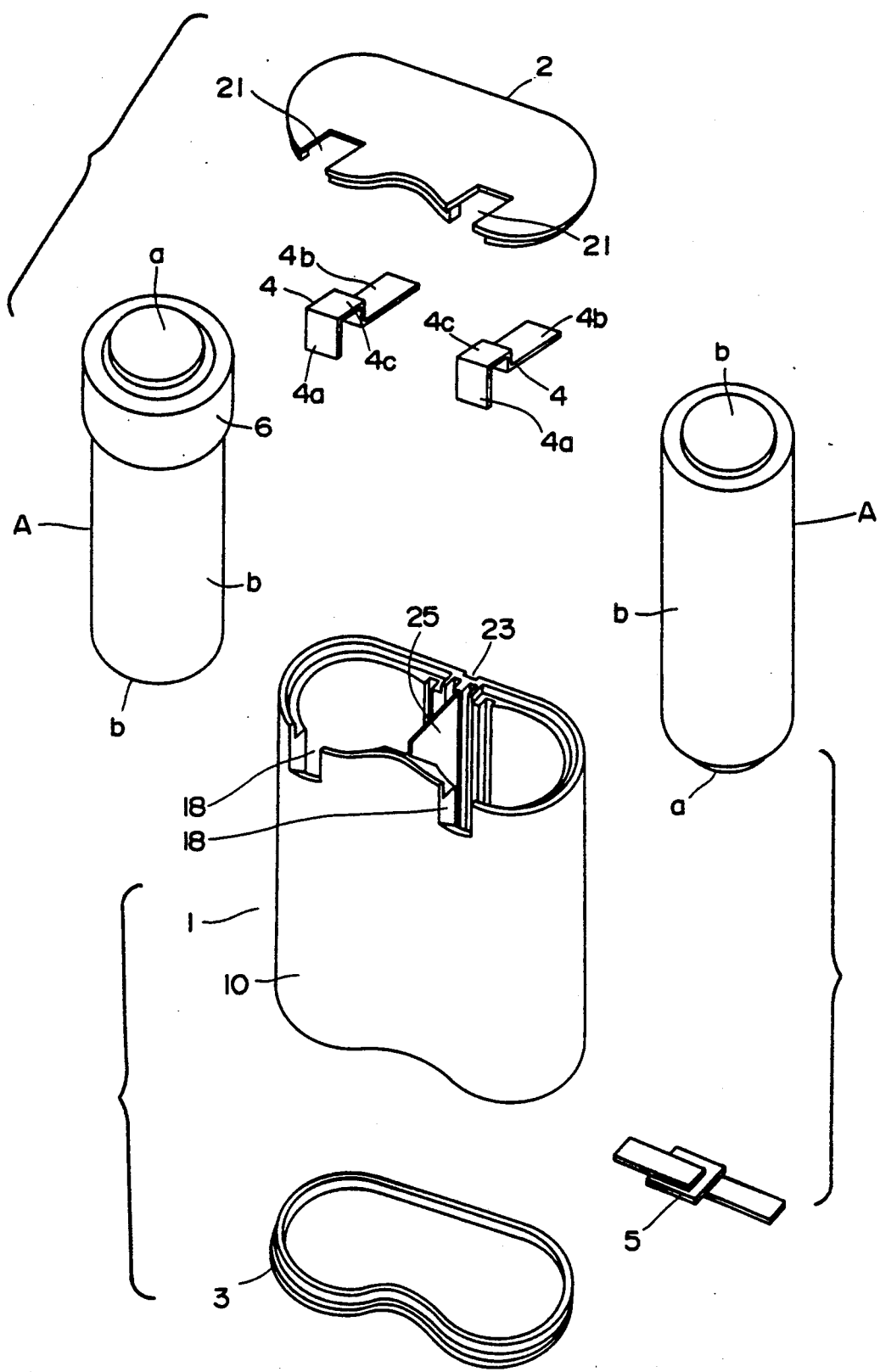
FIG. 6 is a disassembled perspective view of the packed battery according to the present invention.
Figure 7:
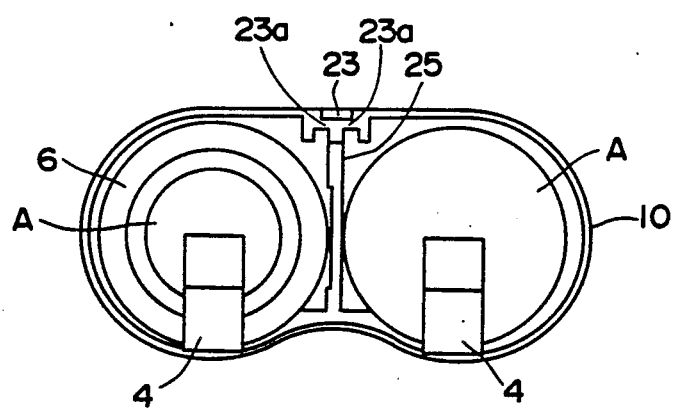
FIG. 7 is a plan view of the same without a first (top) lid.
Figure 9:
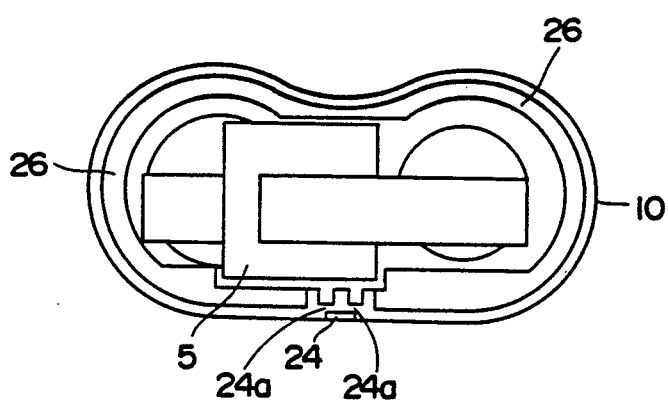
FIG. 9 is a bottom view of the same without a second (bottom) lid.
Figure 11:
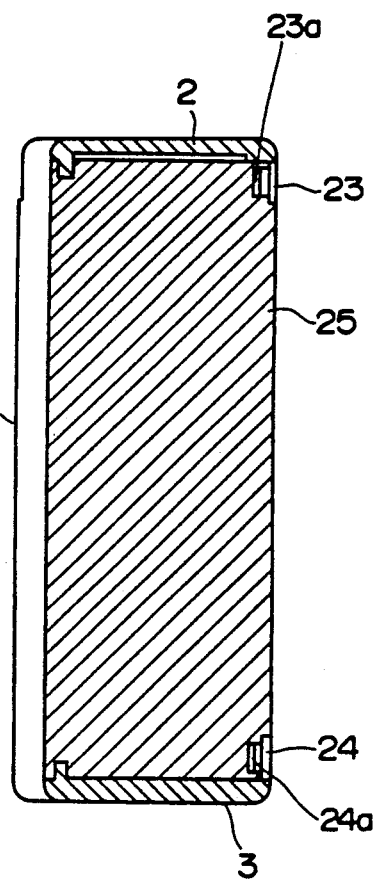
FIG. 11 is a cross sectional view taken along the line XI—XI of FIG. 8.
Figure 12:
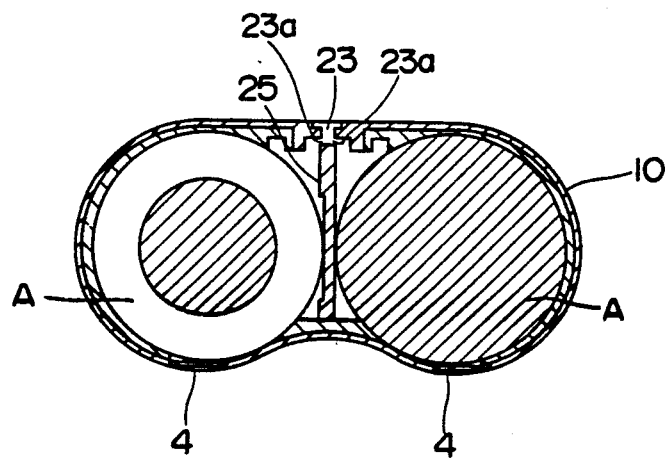
FIG. 12 is a cross sectional view taken along the line XII—XII of FIG. 8.

The tubular body 10 incorporates also a partition 25 which is disposed intermediately of a crosswise direction of the two parallely arranged battery cells (A), (A) so as to separate the two positive-electrode uninsulated battery cells (A), (A) from each other for insulation. Although the partition 25 is provided in this embodiment extending axially of and throughout the length of the battery cell (A), it may extend partially. The most projecting edges of the arcuate side of the tubular body 10 is provided with a couple of square notches 18, 18 formed in the first lid 2 end thereof. On the other hand, the flat side of the tubular body 10 has a square notch 23 formed in the first lid 2 end thereof and at a location where it meets the partition 25, as shown in FIGS. 6, 7 and 11. A similar notch 24 is provided in the second lid 3 end of the same as shown in FIGS. 9 and 11. The two notches 23 and 24 have respectively slits 23a, 23a and 24a, 24a at both ends of the inside thereof and function as air relief vents after assembling. The tubular body 10 is provided at the first lid 2 end with a step portion having a bit increased inner diameter and also, at the second lid 3 end with a flange 26 projected a bit inward from the end and extending towards the center thereof. The flange 26 is arranged in length so as to hold in position the two battery cells (A), (A) inserted through the first lid 2 end opening but not to extend the negative electrode (a).

Figure 8:
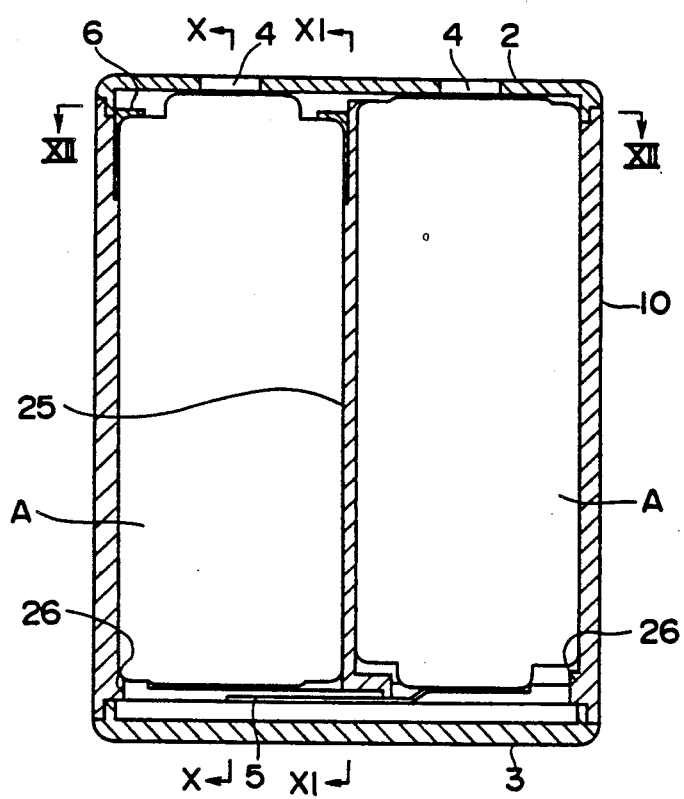
FIG. 8 is a cross sectional front view of the same.
Figure 10:
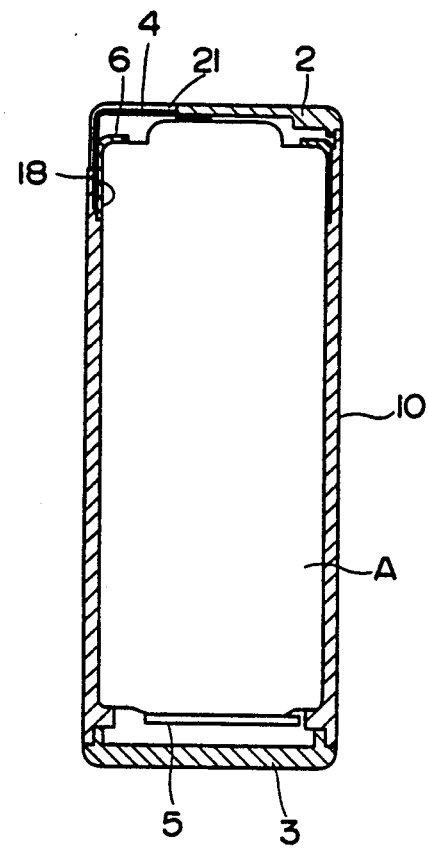
FIG. 10 is a cross sectional view taken along the line X—X of FIG. 8.

A pair of battery housing spaces separated by the partition 25 in the tubular body 10 are arranged differently in two respects. As best shown in FIGS. 8 and 10, a space for housing one battery cell with its negative electrode (a) situated in the first lid 2 end is radially enlarged in a portion for accepting the insulating ring 6. The flange 26 is formed so that its position (or thickness) relative to the first lid 2 end is different between the two spaces. More specifically, a portion of the flange 26 in space for housing battery cell (A) with the insulation ring 6 is thinner in thickness than that in the other battery housing space while the two portions of the flange 26 are equally located at the second lid 3 end axially of the battery cells. Accordingly, the battery cell (A) in the former space is held by the flange 26 with the position of its positive electrode (b) end restricted. The rim of the negative electrode (a) end of the battery cell (A) in the latter space comes into contact with the flange 26 and the negative electrode (a) itself projects from the first lid 2 side end of the flange 26 which is arranged in length not to extend the negative electrode (a) of a battery cell. The length of the flange 26 is determined so that the projected negative electrode (a) end of the battery cell is flush with the positive electrode (b) end of the other battery cell.

The first lid 2 has an approximately elliptical shape corresponding to the cross sectional shape of the tubular body 10. The first lid 2 is provided with two square notches 21, 21 cut towards the other side end at the positions to meet the two notches 18, 18 respectively and also, at the back side with a rib for fitting in the first lid 2 side step portion of the tubular body 10.

The second lid 3 has also an approximately elliptical shape corresponding to the cross sectional shape of the tubular body 10 and incorporates a rib for fitting in the portion between the second lid 3 end of the tubular body 10 and the flange 26.

There are provided a couple of terminal members 4, 4, each of which is shaped of two L's in cross section. The terminal member 4 comprises an electrode connector portion 4b for seating between the first lid 2 and the battery cell (A) end, an upright portion corresponding to the thickness of the first lid 2, an end contactor portion 4c formed at a right angle to the upright portion for fitting in the notch 21 so as to be flush with the upper surface of the first lid 2, and a side contactor portion 4a formed at a right angle to the end contactor portion 4c for fitting in the notch 18.

As the battery cells (A), (A) are placed in opposite directions in the tubular body 10, their respective positive and negative electrodes are connected to each other by a connector member 5 at the second lid 3 end for series connection. The connector member 5 includes an overheat and over-current flow protector such as a PTC element interposed between two conductive members and can be seated, at a predetermined position for adjusting the flange 26 of the tubular body 10 thereto at the second lid 3 side before the second lid 3 being closed.

A procedure of assembling the packed battery according to the present invention having such an arrangement will be described. The insulation ring 6 is first fitted onto one end of the battery cell (A). The battery cell (A) is then inserted, with its insulation ring 6 end upward, into one of the inner spaces, which is radially enlarged for accepting the insulation ring 6, of the tubular body 10 kept with its second lid 3 end downward.

The other battery cell (A) is also inserted into the other inner space of the tubular body 10 in the opposite direction to the first battery cell (A). While the side contactor portions 4a, 4a of their respective terminal members 4, 4 are fitted in the notches 18, 18 respectively, the electrode connector portions 4b, 4b of the same are placed in contact with their respective upper ends of the battery cells (A), (A) and then, welded to the corresponding electrodes of the battery cells (A), (A) respectively. Then, the first lid 2 is fitted into the tubular body 10 with its notches 21, 21 adjusting to the end contactor portions 4c, 4c of the terminal members 4, 4 respectively.

While the tubular body 10 stands with its lower end downward on a base, it is joined with the first lid 2 by ultrasonic wave welding using an ultrasonic wave transducer directly applied to the first lid 2.

The tubular body 10 is then placed upside down and the second lid 3 is fitted into the tubular body 10 while the connector member 5 bridges between the two electrodes of their respective battery cells (A), (A) for series connection. The tubular body 10 and the second lid 3 are joined together by ultrasonic wave welding with the first lid 2 seated at the bottom.

During welding, the battery cells (A), (A) are held in the tubular body 10 by the flange 26 projecting inwardly of the tubular body 10 and thus, prevented from falling downward through the lower opening of the tubular body 10. This facilitates an assembling job and permits an automatic operation of the assembling. Needless to say, the battery cells (A), (A) are kept in position by the first lid 2 when the tubular body 10 is turned upside down after welding of the first lid 2. Since both the confronting first and second lids 2, 3 are closely fitted in with the tubular body 10 along their circumferential edges, the ultrasonic wave welding can be executed with high efficiency therealong in approximately similar conditions.

The insulation ring 6 protects the terminal member 4 from short circuit between the negative electrode (a) and the negative electrode (a) end rim of the positive electrode (b) which results from fault positioning during welding.

Figure 13:
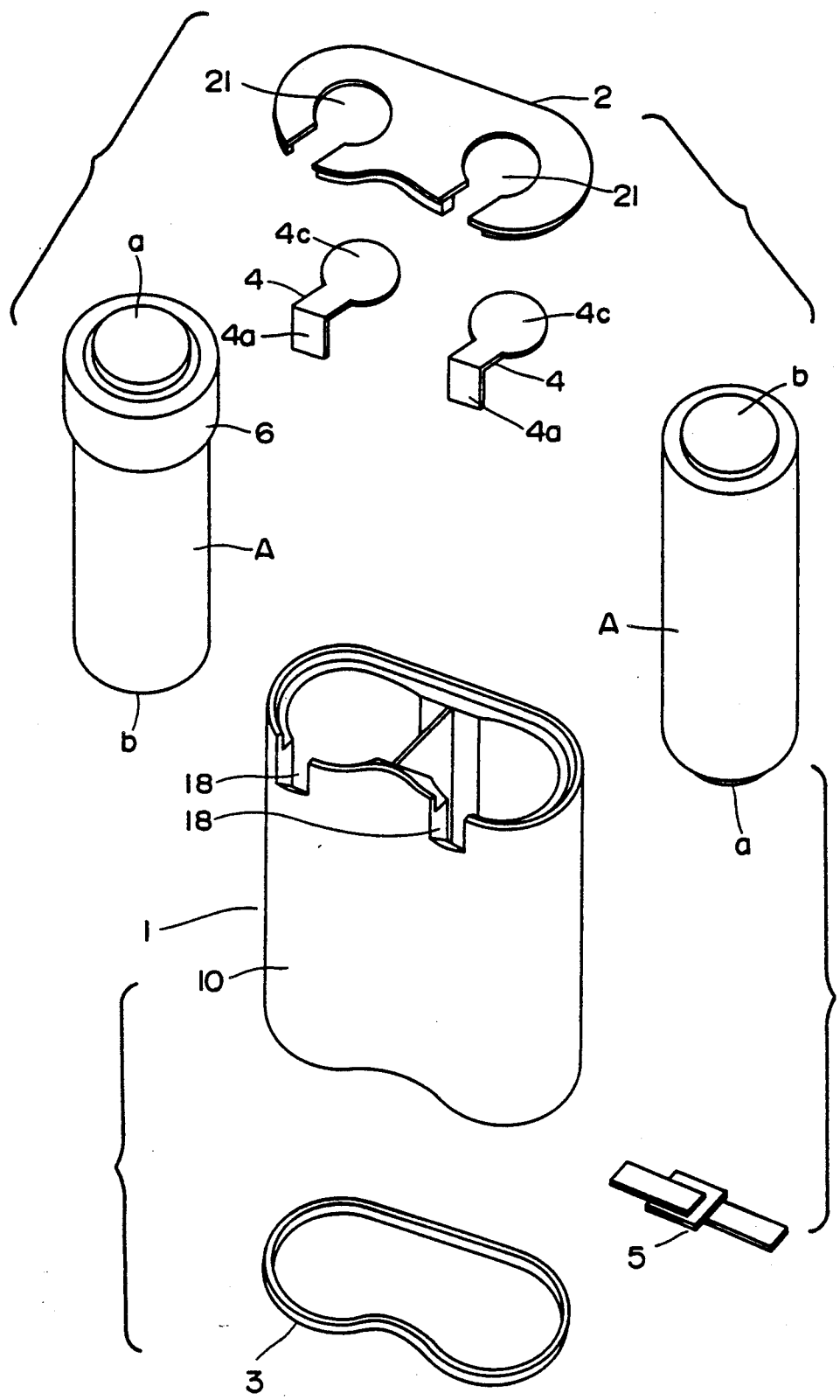
FIG. 13 is a disassembled perspective view showing a second embodiment of the present invention.

FIG. 13 is a disassembled perspective view showing a second embodiment of the present invention.

According to the second embodiment, each notch 21 in the first lid 2 is a cutout not only for a square shape notch 18 but also for a round shape concentrically of the upper end of the battery cell (A). Thus, each terminal member 4 has a shape corresponding to the shapes of the notches 18 and 21. More particularly, the terminal member 4 is L-shaped in cross and comprises a side contactor portion 4a for fitting in the notch 18 and a keyhole-shaped end contactor portion 4c for fitting in the notch 21. The side and end contactor portions 4a, 4c are fitted in their respective notches 18 and 21 so as to be flush with the tubular body 10 and the inner surface of the first lid 2 respectively.

Figure 14:
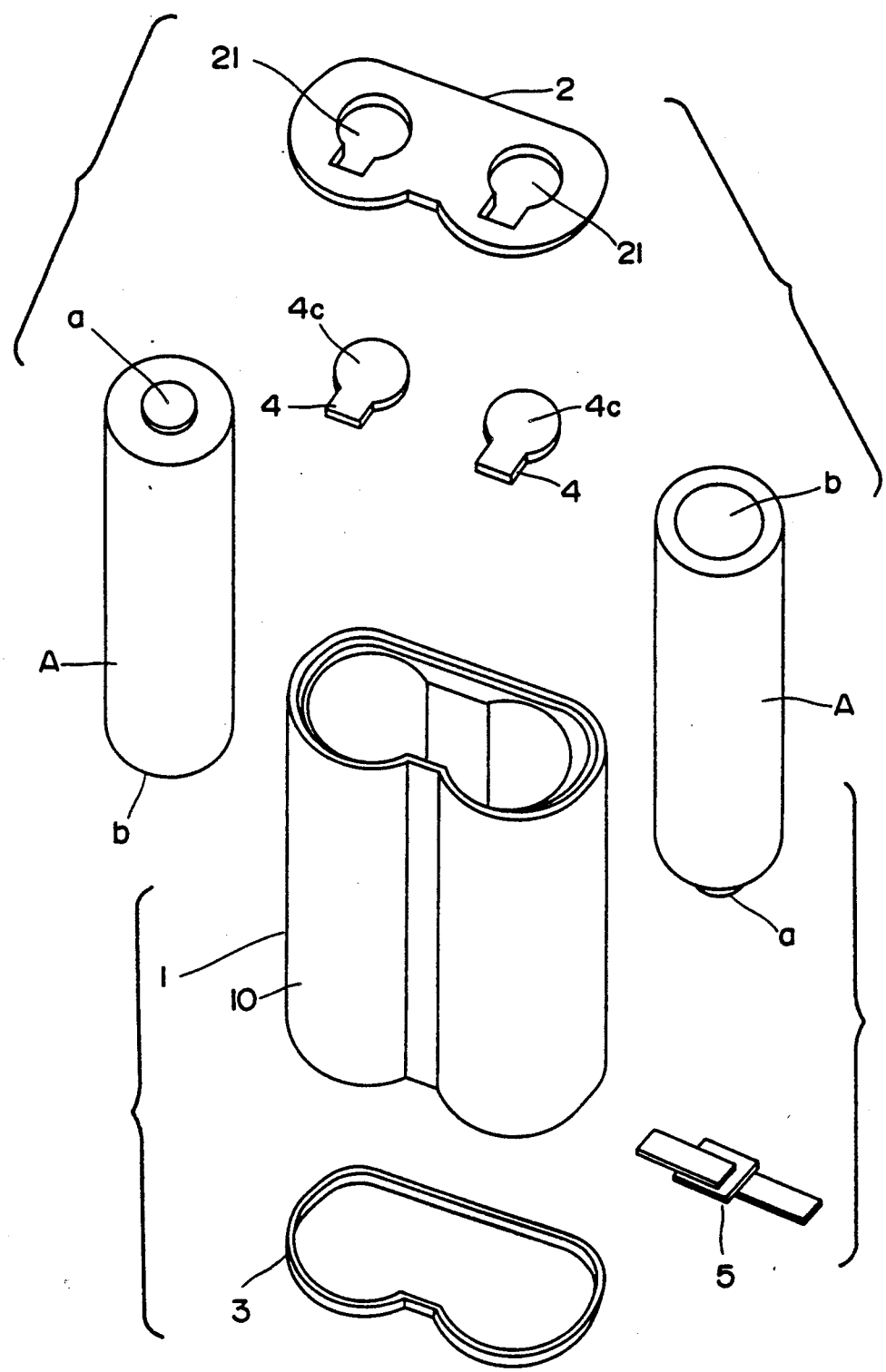
FIG. 14 is a disassembled perspective view showing a third embodiment of the present invention.

FIG. 14 is a disassembled perspective view showing a third embodiment of the present invention.

According to the third embodiment, the first lid 2 has only openings for adjusting the terminal members 4, 4. As shown in this figure, the two keyhole-shaped openings 21, 21 are formed in the first lid 2 consisting of square openings at the arcuate side end and round opening cutouts concentrically of the end of the battery cell (A), (A). The terminal member 4 thus has a shape corresponding to that keyhole shape.

Also, the two battery cells (A), (A) are separated without using the partition 25. This can be realized if a battery housing space in the tubular body 10 is defined by the inner surface of the same as having at center a gap for separation.

When the terminal member 4 is small in size enough to keep it away from the positive electrode (b) about the negative electrode (a) end rim, the insulation ring 6 may be omitted.

According to the present invention, the battery case can be uniformly welded throughout the welding positions by ultrasonic wave welding. Therefore, while the welding strength is satisfactory, no deformation in exterior shape is produced caused by pressing out resin material.

Also, the procedure of assembling can be facilitated as the battery cells are kept in position by the flange 26 and prevented from falling out from the tubular body 10 which opens at both ends. Although the flange 26 is employed for protecting the battery cells from dropping in the embodiments, another projection of appropriate shape may also be used for the same purpose.

The relation between the present packed battery and an electric apparatus loading the same will be described.

In the first and second embodiments, the terminal members 4, 4 are exposed at both end and side of the case. This allows an electric apparatus to have power terminals at any of the two corresponding locations.

Figure 15:
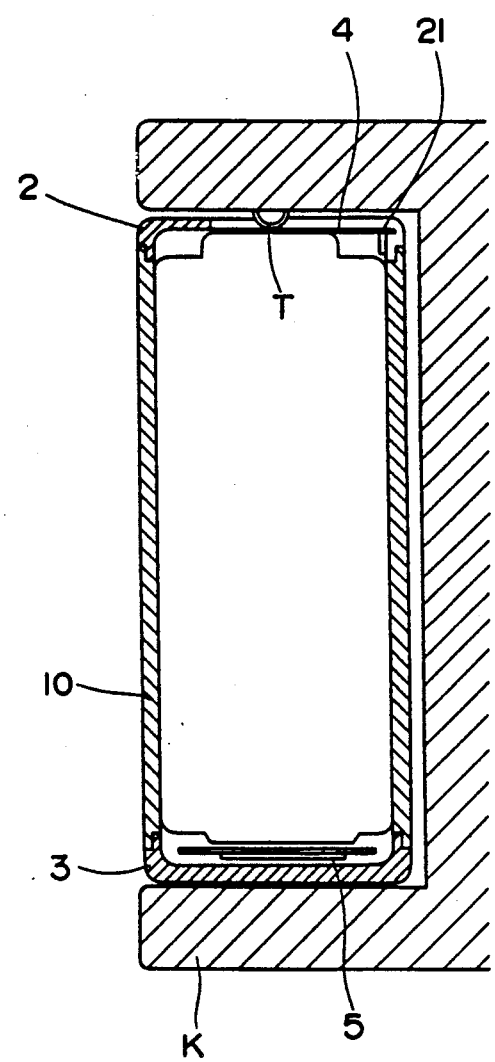
FIG. 15 is a cross sectional view showing the second embodiment loaded in an electric apparatus.
Figure 16A:
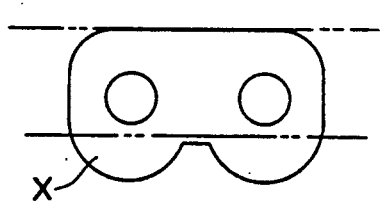
FIGS. 16, 17 and 18 are explanatory views showing the arrangements of terminal members.
Figure 16B:
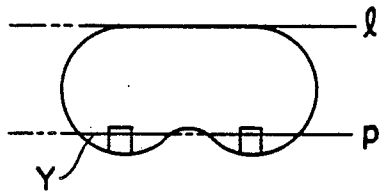
Figure 16B:
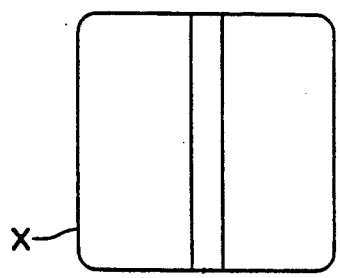
Figure 16D:
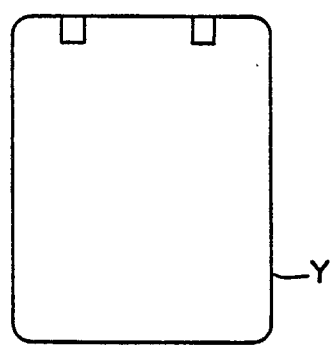

FIG. 15 is a cross sectional view showing a packed battery of the second embodiment loaded in an electric apparatus (K). As shown, the terminal member 4 is kept in contact with a contactor (T) located at the top of a packed battery loading space of the apparatus (K).

FIG. 16 shows an arrangement of terminal members in a prior art packed battery. A plan and a side views are shown at left illustrating a packed battery (X) having the terminal members on the upper central areas only. At right are a plan and a side views of a packed battery (Y) having the terminal members, each extending between the top side end and the side upper end in a similar manner to the first embodiment of the present invention. In both the plan views, the two straight lines (l) and (p) represent a back wall at a packed battery loading space in an electric apparatus and a contactor location therein for a packed battery of the type (Y) shown in the right view respectively.

It is apparent from comparison between both the left and right views that the electric apparatus for loading such a particular type packed battery (Y) on the right cannot be loaded with a packed battery (X) shown in the left view. Similarly, the electric apparatus for loading a packed battery (X) cannot be loaded with a packed battery (Y).

Figure 17A:
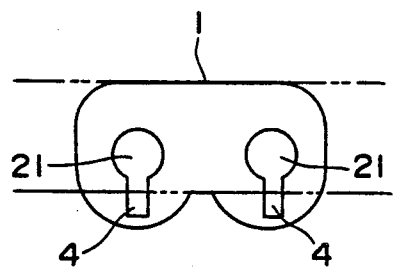
Figure 17B:
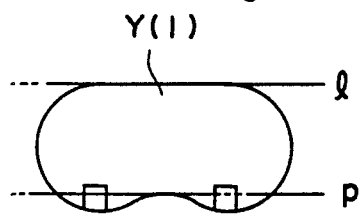

FIG. 17 shows plan views of the third embodiment of the present invention (on the left) and a prior art packed battery (Y) or the first embodiment (on the right) respectively. As shown, the notch 21 has a keyhole shape according to the third embodiment of the present invention and thus, can cross the straight line (p). Then, the packed battery on the left can be used for loading in an electric apparatus adapted for a packed battery (Y) shown on the right. It is also understood that the packed battery of the third embodiment can replace the battery (X) of FIG. 16. Similarly, the packed battery of the second embodiment exposed both to the end and the side can replace either the battery (X) or (Y). Furthermore, it can replace the battery (X) even when the electric apparatus has its power contactors on the side.

Figure 18A:
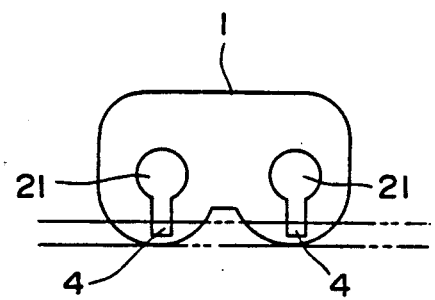
Figure 18B:
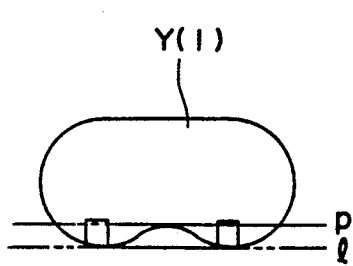

FIG. 18 shows the positional relation between the third embodiment (on the left) and the packed battery (Y) or the first embodiment (on the right) when the positioning in an electric apparatus is made with reference to the arcuate side of the case 1. In this case, the third embodiment and the second embodiment not shown in the figure can be replaced with each other. Particularly, a packed battery of the second embodiment can replace the battery (Y) even when the contactors of an electric apparatus are located in the side.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A packed battery comprising: a plurality of column-shaped battery cells connected in series to each other; a tubular body housing having end openings and housing said plural column shaped battery cells in parallel arrangement; first and second lids for closing said end openings in said tubular body respectively; terminal members interposed between said first lid and the electrodes of the battery cells and having portions thereof exposed to the outside; and a connector member interposed between said second lid and the electrodes of said battery cells and connecting said battery cells to each other in series, said connector member including an overheat and over-current flow protector element.

2. A packed battery according to claim 1 wherein said tubular body and first and second lids are formed of electrical insulation materials while both the electrodes of said battery cells are uncoated.

3. A packed battery according to claim 1 wherein one of said battery cells has a ring fitted thereon for insulation of a top end portion of the electrode thereof extending between the side and top ends thereof at the first lid end.

4. A packed battery according to claim 1 wherein at one of said openings said tubular body has a projection which comes into contact with the circumferential ends of said battery cells.

5. A packed battery according to claim 4 wherein said projection is arranged at a position so as to make the ends of the plural battery cells flush with each other.

6. A packed battery according to claim 1 wherein said tubular body has a partition therein for separating the battery cells so as not to contact with each other.

7. A packed battery according to claim 1 wherein said terminal member is exposed extending between the central and end portion of the first lid.

8. A packed battery according to claim 1 wherein said terminal member is exposed extending between said first lid and a portion of said tubular body.

* * * * *